United States Patent
Rummel et al.

(10) Patent No.: US 11,236,232 B2
(45) Date of Patent: Feb. 1, 2022

(54) CROSSLINKABLE COMPOSITIONS

(71) Applicant: Wacker Chemie AG, Munich (DE)

(72) Inventors: Timothy Rummel, Saline, MI (US);
Kathleen Beekel, Adrian, MI (US);
Joel Kennard, Ypsilanti, MI (US);
Christine Klingler, Pittsford, MI (US);
Keith Stowell, Morenci, MI (US)

(73) Assignee: WACKER CHEMIE AG, Munich (DE)

( * ) Notice: Subject to any disclaimer, the term of this patent is extended or adjusted under 35 U.S.C. 154(b) by 106 days.

(21) Appl. No.: 16/724,472

(22) Filed: Dec. 23, 2019

(65) Prior Publication Data

US 2021/0189128 A1     Jun. 24, 2021

(51) Int. Cl.
*C08L 83/04*     (2006.01)
*C08K 5/05*     (2006.01)

(52) U.S. Cl.
CPC .............. *C08L 83/04* (2013.01); *C08K 5/05* (2013.01); *C08L 2312/08* (2013.01)

(58) Field of Classification Search
CPC .......... C08G 77/12; C08G 77/20; C08L 83/04
See application file for complete search history.

(56) References Cited

U.S. PATENT DOCUMENTS

| | | | |
|---|---|---|---|
| 4,292,434 A | 9/1981 | Lindner et al. | |
| 5,691,435 A | 11/1997 | Herzig et al. | |
| 5,703,190 A | 12/1997 | Dauth et al. | |
| 2018/0079914 A1* | 3/2018 | Shepherd | C09D 183/06 |

FOREIGN PATENT DOCUMENTS

CN     108795060     * 11/2018

OTHER PUBLICATIONS

CN 108 795 060 machine translation (2018).*

* cited by examiner

*Primary Examiner* — Kuo Liang Peng
(74) *Attorney, Agent, or Firm* — Brooks Kushman P.C.

(57) ABSTRACT

Crosslinkable compositions contain
(1) organosilicon compounds which have radicals containing aliphatic carbon-carbon multiple bonds
(2) organosilicon compounds having Si-bonded hydrogen atoms
(3) catalysts which promote the addition of Si-bonded hydrogen onto aliphatic multiple bond and
(4) agents which retard the addition of Si-bonded hydrogen onto aliphatic multiple bond at room temperature of the formula $$CH_2=C(R^2)-CR^1(OH)-R \qquad (I)$$

wherein
R is hydrogen or a monovalent hydrocarbon radical having 1 to 12 carbon atoms, optionally substituted with one or more hydroxyl groups,
with the proviso that R is not hydrogen if $R^1$ and R are both hydrogen,
$R^1$ is hydrogen or a monovalent hydrocarbon radical having 1 to 12 carbon atoms, or $R^1$ together with R form a cyclic hydrocarbon radical having 1 to 12 carbon atoms and
$R^2$ is hydrogen or a monovalent hydrocarbon radical having 1 to 12 carbon atoms.

14 Claims, No Drawings

CROSSLINKABLE COMPOSITIONS

BACKGROUND OF THE INVENTION

1. Field of the Invention

The invention relates to crosslinkable compositions comprising
(1) organosilicon compounds which have radicals containing aliphatic carbon-carbon multiple bonds,
(2) organosilicon compounds having Si-bonded hydrogen atoms,
(3) catalysts which promote the addition of Si-bonded hydrogen onto aliphatic multiple bond, and
(4) agents which retard the addition of Si-bonded hydrogen onto aliphatic multiple bond at room temperature.

2. Description of the Related Art

Organopolysiloxane compositions which are curable by reaction of SiH groups with Si-bonded olefinic groups in the presence of a hydrosilylation catalyst are well known. The term "hydrosilylation catalyst" is understood as meaning a catalyst which promotes the addition of Si-bonded hydrogen onto an aliphatic multiple bond. Since crosslinking begins in the course of mixing the above constituents (1), (2) and (3), it is common practice to make addition-crosslinking organopolysiloxane compositions available in two or more components, one comprising the olefinically unsaturated organopolysiloxane and the hydrosilylation catalyst and the other comprising the organohydridopolysiloxane crosslinking agent.

If it is necessary to extend the pot life of addition-crosslinking organopolysiloxane compositions or to provide a one-component addition-crosslinking organopolysiloxane composition, an inhibitor can be present. The term "inhibitor" is understood as meaning agents which retard the addition of Si-bonded hydrogen onto an aliphatic multiple bond at room temperature, but do not retard crosslinking at elevated temperatures. Inhibitors of this kind are heat-deactivatable inhibitors or are sufficiently volatile to be expelled from the organopolysiloxane compositions at elevated temperature.

The label industry produces many labels that are to be printed via thermal energy, activating encapsulated ink within a paper substrate. These are called Direct Thermal Labels. Currently, these labels are laminated to a siliconized paper or film liner, which serves only as a carrier and is thrown away after the label is dispensed. A more ideal solution is to siliconize the thermally activatable label paper and not use a liner at all, reducing cost and waste. This is not possible with current thermally curing silicone systems, as the activation temperature of the curing mechanism exceeds the activation temperature of the ink capsules in the paper, causing the label to turn from white to black or other colors during application and curing. Another non-ideal solution is the use of UV curable silicone systems. These fail to perform adequately in many applications because they do not provide good enough release of the adhesive for many labels, and because they foul the thermal print heads.

U.S. Pat. No. 5,703,190 A discloses crosslinkable organosilicone compositions containing, as heat-deactivatable inhibitors, unsaturated organic compounds with CH≡C—C(OH)CH₃— end groups and one or more double bonds e.g. a compound of the formal

which is commercially available from BASF under the tradename "Dehydrolinalool".

U.S. Pat. No. 5,691,435 A discloses as inhibitors for crosslinking organosilicone compositions a list of compounds, including organic compounds with a triple bond, such as acetylinic alcohols, and the above mentioned "Dehydrolinalool" (DHL).

SUMMARY OF THE INVENTION

The object of the present invention is to provide inhibitors which extend pot life by retarding the crosslinking of the addition-crosslinking compositions based on organosilicon compounds at room temperature, but which at elevated temperatures less than or equal to 75° C. permit sufficiently complete crosslinking of the addition-crosslinking compositions based on organosilicon compounds, i.e. do not impair the crosslinking rate at elevated temperatures less than or equal to 75° C., and which possess no hazard potential with regard to toxicity and handling.

These and other objects are surprisingly and unexpectedly provide by the present invention which provides crosslinkable compositions comprising
(1) organosilicon compounds which have radicals containing aliphatic carbon-carbon multiple bonds
(2) organosilicon compounds having Si-bonded hydrogen atoms
(3) catalysts which promote the addition of Si-bonded hydrogen onto aliphatic multiple bond and
(4) agents which retard the addition of Si-bonded hydrogen onto aliphatic multiple bond at room temperature of the formula $$CH_2=C(R^2)-CR(OH)-R \qquad (I)$$

wherein
R is a hydrogen atom or a monovalent hydrocarbon radical having 1 to 12 carbon atoms optionally substituted with one or more hydroxyl groups,
with the proviso that R is not a hydrogen atom if $R^1$ and $R^2$ are both a hydrogen atom,
$R^1$ is a hydrogen atom or a monovalent hydrocarbon radical having 1 to 12 carbon atoms or $R^1$ form together with R a cyclic hydrocarbon radical having 1 to 12 carbon atoms and
$R^2$ is a hydrogen atom or a monovalent hydrocarbon radical having 1 to 12 carbon atoms.

DETAILED DESCRIPTION OF THE PREFERRED EMBODIMENTS

The agents (4) according to formula (I), so-called inhibitors, inhibit the hydrosilylation in the crosslinkable composition appropriately, even when used in low concentration, extend the pot life of the crosslinkable composition and allow for curing to take place at temperatures under 75° C., e.g. at temperatures as low as 60° C., without impairing the crosslinking rate.

Examples of radicals R, $R^1$ and $R^2$ are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical, nonyl radicals such as the n-nonyl radical; decyl radicals such as the n-decyl radical; dodecyl radicals such as the n-dodecyl radical; cycloalkyl radicals, such as cyclopentyl, cyclohexyl, cycloheptyl and methyl-cyclohexyl radicals; aryl radicals such as the phenyl radical; alkaryl radicals such as the o-, m-, p-tolyl radicals, xylyl radicals and ethylphenyl radicals; and aralkyl radicals, such as the benzyl radical and the α- and β-phenylethyl radicals.

The radical R can also be an alkenyl radical such as the vinyl radical or a radical of the formula —CH$_2$CH$_2$CH=CH(CH$_3$)$_2$ (4,4-dimethyl-3-butenyl).

Examples of inhibitor (4) according to formula (I) are linalool, a compound of the formula

CH$_2$=CH—C(OH)CH$_3$—CH$_2$—CH$_2$—CH=C(CH$_3$)$_2$, 1-dodecen-3-ol,
1-decen-3-ol,
1-penten-3-ol,
1-hexen-3-ol,
1-hepten-3-ol,
1,4-pentadien-3-ol
2-methyl-2-propen-1-ol,
3-methyl-5-hexen-3-ol,
1-vinyl-cyclohexanol,
3-methyl-1-penten-3-ol,
2-methyl-1-hepten-3-ol and
2-methyl-3-buten-2-ol,
wherein linalool is a preferred example.

The inhibitor (4) according to formula (I) can be used alone or in combination with other additional inhibitors such as acetylinic alcohols.

Examples for acetylinic alcohols are
1-ethynylcyclohexan-1-ol (ECH),
2-methyl-3-butyn-2-ol (MB),
3-methyl-1-pentyn-3-ol,
2,5-dimethyl-3-hexyne-2,5-diol
3,5-dimethyl-1-hexyn-3-ol and
3,7-dimethyl-oct-1-yn-6-en-3-ol.

Preferred examples for acetylinic alcohols are
1-ethynylcyclohexan-1-ol (ECH) and
2-methyl-3-butyn-2-ol (MB).

The inhibitors (4) according to formula (I) are employed in quantities of from 0.02% by weight to 3.0% by weight, preferably in quantities from 0.2% by weight to 1.5% by weight, based on the overall weight of the organosilicon compounds (1) and (2).

When additional inhibitors such as allylic alcohols are used, they are employed in quantities of from 0.02% by weight to 1.0% by weight, preferably in quantities from 0.04% by weight to 0.30% by weight, based on the overall weight of the organosilicon compounds (1) and (2).

The inhibitors (4) according to the invention can be mixed beforehand with the organosilicon compounds (1) or (2) and/or with the catalyst component (3).

The compositions according to the invention with the constituents (1), (2), (3) and (4) are preferably provided in the form of two-component compositions, with the constituents (2) and (3) being separate from one another. The composition according to the invention can also be provided in a form, wherein the constituents (1), (2) and (3) being separate from one another.

The inhibitors (4) of formula (I) can be used in all crosslinkable compositions where it is possible to use inhibitors which retard the addition of Si-bonded hydrogen onto aliphatic multiple bond at room temperature.

As organosilicon compounds (1) which comprise radicals having aliphatic carbon-carbon multiple bonds it is possible to use linear or branched organosilicon compounds.

As organosilicon compounds (1) it is preferred to use linear or branched organopolysiloxanes comprising units of the formula R$_x^4$R$_y^5$SiO$_{((4-a-b)/2)}$ (II)

in which R$^4$ is a monovalent hydrocarbon radical which is free from aliphatic carbon-carbon multiple bonds and has 1 to 18 carbon atoms per radical, and R$^5$ is a monovalent hydrocarbon radical with at least one terminal aliphatic carbon-carbon multiple bond, having 2 to 12 carbon atoms per radical, x is 0, 1, 2 or 3,
y is 0, 1 or 2
and the sum x+y is 0, 1, 2 or 3, with the proviso that on average there is at least 1 radical R$^5$ per molecule, preferably at least 2 radicals R$^5$ per molecule.

Preferred linear organosilicon compounds (1) are organopolysiloxanes of the formula R$^5_g$R$^4_{3-g}$SiO(SiR$^4_2$O)$_n$(SiR$^4$R$^5$O)$_m$SiR$^4_{3-g}$R$^5_g$ (III)

in which
R$^4$ and R$^5$ have the meaning given above,
g is 0, 1 or 2,
n is 0 or an integer from 1 to 1500, and
m is 0 or an integer from 1 to 200,
with the proviso that there is at least one radical R$^5$ per molecule, preferably at least 2 radicals R$^5$ per molecule.

In formula (III) of the present invention, n units —(SiR$^4_2$O)— and m units —(SiR$^4$R$_5$O)— can be distributed in any desired fashion in the organopolysiloxane molecule.

As organosilicon compounds (1) it is possible to use branched organosilicon compounds such as branched siloxane copolymers which contain hydrocarbon blocks and siloxanes blocks. Examples of such branched siloxane copolymers are described in U.S. Pat. No. 7,888,446 B2 (incorporated by reference), in col. 1, line 40 to col. 4, line 24.

As organosilicon compounds (1) it is possible to use branched siloxane copolymers containing at least one structural unit of the general formula O$_{3-a/2}$R$^4_a$Si—Y(SiR$^4_a$O$_{3-a/2}$)$_b$ (IV)

where
Y is a divalent to dodecavalent organic radical, preferably di-, tri- or tetravalent organic radical, more preferably a divalent organic radical, wherein the organic radical has 1 to 30 C atoms and may contain one or more 0 atoms,
a is 0 or 1, and
b is an integer from 1 to 11, preferably 1, 2 or 3, more preferably 1,
and at least one, preferably at least two, siloxane units of the formula R$^5$R$^4_2$SiO$_{1/2}$ and optionally siloxanes units of the formula R$^4_2$SiO$_{2/2}$ and/or R$^4_3$SiO$_{1/2}$ in which R$^4$ and R$^5$ have the meaning given above.

The organosilicon compounds (1) have an average viscosity of from 20 to 100,000 mPa·s at 25° C., preferably from 50 to 10,000 mPa·s at 25° C., and more preferably from 100 to 500 mPa·s at 25° C.

The viscosities are determined by measurement using rotational viscometry in accordance with DIN EN ISO 3219.

Examples of hydrocarbon radicals R$^4$ are alkyl radicals such as the methyl, ethyl, n-propyl, isopropyl, n-butyl, isobutyl, tert-butyl, n-pentyl, isopentyl, neopentyl and tert-pentyl radicals; hexyl radicals such THE n-heptyl radical;

octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals, such as the n-octadecyl radical; cycloalkyl radicals such as cyclopentyl, cyclohexyl, cycloheptyl and methylcyclohexyl radicals; aryl radicals such as the phenyl, naphthyl, anthryl and phenanthryl radicals; alkaryl radicals such as the o-, m- and p-tolyl radicals, xylyl radicals and ethylphenyl radicals; and aralkyl radicals such as the benzyl radical, and the α- and the β-phenylethyl radicals.

Examples of radicals $R^5$ are alkenyl radicals such as the vinyl, 5-hexenyl, 2,4-divinylcyclohexylethyl, 3,4-divinylcyclohexylethyl, 2-propenyl, allyl, 3-butenyl and 4-pentenyl radicals, and alkynyl radicals such as the ethynyl, propargyl and 2-propynyl radicals.

Organosilicon compounds (2) which contain Si-bonded hydrogen atoms, are linear, cyclic or branched organopolysiloxanes comprising units of the formula

$$R_e^4 H_f SiO_{(4-e-f)/2} \quad (V)$$

in which $R^4$ has the meaning given above,
e is 0, 1, 2 or 3,
f is 0, 1 or 2
and the sum of e+f is 0, 1, 2 or 3,
with the proviso that on average there is at least 1 Si-bonded hydrogen atom per molecule, preferably at least 2 Si-bonded hydrogen atoms per molecule.

Organosilicon compounds (2) are preferably organopolysiloxanes of the formula

$$H_h R^4_{3-h} SiO(SiR^4_2 O)_o (SiR^4 HO)_p SiR^4_{3-h} H_h \quad (VI)$$

in which
$R^4$ has the meaning given above,
h is 0, 1 or 2,
o is 0 or an integer from 1 to 1500, and
p is 0 or an integer from 1 to 200,
with the proviso that there is at least 1 Si-bonded hydrogen atom per molecule, in particular at least 2 Si-bonded hydrogen atoms per molecule.

In formula (VI) of the present invention it is understood that o units —(SiR$^4_2$O)— and p units —(SiR$^4$HO)— can be distributed in any desired fashion in the organopolysiloxane molecule.

The organosilicon compounds (2) contain at least 0.2% by weight, preferably from 0.8% to 1.7% by weight, of Si-bonded hydrogen. The organosilicon compounds (2) possess an average viscosity of from 10 to 1000 mPa·s at 25° C., preferably from 10 to 100 mPa·s at 25° C.

The viscosities are determined by measurement using rotational viscometry in accordance with DIN EN ISO 3219.

Organosilicon compounds (2) are employed in quantities of from 0.8 to 10.0, preferably from 1.5 to 2.5, gram atom of Si-bonded hydrogen per mol of Si-bonded radical having aliphatic carbon-carbon multiple bond in the organosilicon compound (1).

Catalysts which promote the addition of Si-bonded hydrogen onto aliphatic multiple bonds, are the same catalysts which have been employed to date for promoting the addition of Si-bonded hydrogen onto aliphatic multiple bond.

The catalysts preferably comprise a metal from the group of the platinum metals such as platinum, palladium or rhodium, or a compound or a complex from the platinum metal group such as platinum, palladium or rhodium, preferably a compound or a complex of platinum.

Examples of such catalysts are metallic and finely divided platinum, which can be on supports such as silica, alumina or activated carbon, compounds or complexes of platinum, such as platinum halides, for example $PtCl_4$, $H_2PtCl_6 \cdot 6H_2O$, $Na_2PtCl_4 \cdot 4H_2O$, platinum-olefin complexes, platinum-alcohol complexes, platinum-ketone complexes, platinum-ether complexes, platinum-aldehyde complexes, including reaction products of $H_2PtCl_6 * 6H_2O$ and cyclohexanone, platinum-vinylsiloxane complexes, such as platinum-1,3-divinyl-1,1,3,3-tetramethyldisiloxane complexes with or without a content of detectable inorganically bonded halogen, bis(gamma-picoline)platinum dichloride, trimethylene-dipyridineplatinum dichloride, dicyclopentadiene platinum dichloride, dimethyl sulfoxide-ethylene-platinum(II) dichloride, cyclooctadiene-platinum dichloride, norbornadiene-platinum dichloride, gamma-picoline-platinum dichloride, cyclopentadiene-platinum chloride and also reaction products of platinum tetrachloride with olefin and primary amine or secondary amine or primary and secondary amine according to U.S. Pat. No. 4,292,434, such as the reaction product of platinum tetrachloride dissolved in 1-octene with sec-butylamine, or ammonium-platinum complexes according to EP-B 110 370.

The catalysts (3) are employed in quantities of from 5 to 500 ppm by weight (parts by weight per million parts by weight), preferably from 20 to 200 ppm by weight, calculated in each case as elemental platinum metal and based on the overall weight of the organosilicon compounds (1) and (2).

The compositions according to the invention are generally cured at the pressure of the surrounding atmosphere, i.e. at about 1020 hPa (abs.), but can also be cured at higher or lower pressures.

The crosslinking of the compositions according to the invention can take place at a temperature of from 40° C. to 200° C., preferably it takes place from 40° C. to 75° C., more preferably from 60° C. to 75° C. As energy sources for crosslinking by heating it is preferred to use ovens, for example convection ovens, heating tunnels, heated rolls, heated plates or heat rays in the infrared range.

In the compositions according to the invention it is possible to use inert, organic solvents, although the use of inert, organic solvents is not preferred.

Examples of inert, organic solvents are toluene, xylene, isophorone, octane isomers, butyl acetate, ethyl acetate, heptane, mineral spirits and isopropanol.

The crosslinkable compositions and the components (1) and (2) can be used in the form of emulsions.

Preferable are emulsions of crosslinkable compositions comprising crosslinkable compositions according to the invention emulsifiers and water.

The emulsifiers can be non-ionic, cationic or anionic emulsifiers or mixtures thereof.

The crosslinkable composition according to the invention can be employed for the preparation of coatings, e.g. coatings which repel tacky substances.

Therefore, the invention provides a process for the preparation of coatings on surfaces, comprising applying crosslinkable compositions containing
(1) organosilicon compounds which have radicals containing aliphatic carbon-carbon multiple bonds
(2) organosilicon compounds having Si-bonded hydrogen atoms
(3) catalysts which promote the addition of Si-bonded hydrogen onto aliphatic multiple bond and (4) agents which retard the addition of Si-bonded hydrogen onto aliphatic multiple bond at room temperature of the formula

$$CH_2=C(R^2)-CR(OH)-R \qquad (I)$$

wherein

R is a hydrogen atom or a monovalent hydrocarbon radical having 1 to 12 carbon atoms optionally substituted with one or more hydroxyl groups, with the proviso that R is not a hydrogen atom if $R^1$ and $R^2$ are both a hydrogen atom, $R^1$ is a hydrogen atom or a monovalent hydrocarbon radical having 1 to 12 carbon atoms or $R^1$ form together with R a cyclic hydrocarbon radical having 1 to 12 carbon atoms and $R^2$ is a hydrogen atom or a monovalent hydrocarbon radical having 1 to 12 carbon atoms, on surfaces and then curing the compositions.

Preferably the compositions are cured at temperatures of from 40° C. to 70° C.

The application of the compositions according to the invention to the surfaces can be accomplished in any desired manner which is suitable and widely known for the preparation of coatings from liquid substances, for example by dipping, brushing, pouring, spraying, rolling, printing, for example by means of an offset gravure coating device, by knife-coating or by means of an airbrush. Particularly suitable for the application is a multi-roll system (4-6 rolls), such as rubber-steel-rubber in which die film is divided so often that finally an application of from 0.6 to 1.2 μm is obtained.

The surfaces which can be treated in the context of the invention can comprise surfaces of any desired materials which are solid at room temperature and 1012 mbar (abs.). Examples of such surfaces are those of paper, wood, cork and plastic films, for example polyethylene films or polypropylene films, woven and nonwoven fabric of natural or synthetic fibers or glass fibers, ceramic articles, glass, metals, polyethylene-coated paper, and cards and boards, including those of asbestos. The abovementioned polyethylene can comprise high-pressure, medium-pressure or low-pressure polyethylene. The paper can comprise low-grade paper types, such as absorbent papers, including raw kraft paper, i.e. kraft paper which has not been pretreated with chemicals and/or polymeric natural substances, having a weight of from 60 to 150 g/m², unsized papers, papers of low freeness value, mechanical papers, unglazed or uncalendered papers, papers which are smooth on one side owing to the use of a dry glazing cylinder during their production, without additional complex measures, and are therefore referred to as "machine-glazed papers", uncoated papers or papers produced from waste paper, i.e. recycled papers. The paper to be treated in accordance with the invention may also comprise high-grade papers, such as low-absorbency papers, sized papers, papers of high freeness value, chemical papers, calendered or glazed papers, glassine papers, parchmentized papers or precoated papers. The cards and boards may also be of low or high grade.

The compositions according to the invention are suitable, for the production of release, backing and interleaving papers, including interleaving and release papers which are employed in die production of, cast films or decorative films, or of foams, including those of polyurethane. The compositions according to the invention are also suitable for the production of release, backing and interleaving cards, films and cloths, for treating the reverse sides of self-adhesive tapes or self-adhesive films or die written faces of self-adhesive labels. The compositions according to the invention are also suitable for treating packaging material, such as paper, cardboard boxes, metal foils and drums, for example, cardboard, plastic, wood or iron, which is or are intended for the storage and/or transportation of tacky goods, such as adhesives, sticky foodstuffs, for example cakes, honey, candies and meat, bitumen, asphalt, greased materials and crude rubber. A further example of the use of the compositions according to the invention is die treatment of supports for the transfer of contact adhesive layers in the so-called transfer process.

The compositions according to the invention are suitable for the production of self-adhesive materials connected to the release paper, both by off-line methods and by in-line methods. In the off-line method, the silicone composition is applied to the paper and crosslinked, and then in a subsequent step, usually after the winding-up of the release paper onto a roll and after storage of the roll, an adhesive film, which lies for example on a label face paper, is applied to the coated paper and the composite is then compressed. In the in-line method, the silicone composition is applied to the paper and crosslinked, the silicone coating is coated with the adhesive, the label face paper is then applied to the adhesive and the composite is finally compressed. In the off-line method, the rate of winding is guided by the time which is necessary to render the silicone coating tack-free. In the in-line method, the speed of the process is guided by the time which is necessary to render the silicone coating migration-free. The off-line method and the in-line method can be operated using the compositions according to the invention at a rate of from 50 to 500 m/min, preferably from 100 to 300 m/min.

The crosslinkable compositions can be used in the label industry. The label industry produces many labels that are to be printed via thermal energy activating encapsulated ink within a paper substrate. These are called Direct Thermal Labels. Currently, these labels are laminated to a siliconized paper or film liner, which serves only as a carrier and is thrown away after the label is dispensed. A more ideal solution is to siliconize the thermally activatable label paper and not use a liner at all, reducing cost and waste. This is not possible with current thermally curing silicone systems, as the activation temperature of the curing mechanism exceeds the activation temperature of the ink capsules in the paper, causing the label to turn black during application and curing.

When using the crosslinkable composition according to the invention for coating the thermally activatable label paper the compositions can be cured at low temperatures of from 40° C. to 75° C. which is under the activation temperatures of the ink capsules in the paper so that the ink capsules remain unchanged.

The crosslinkable compositions with the inhibitor according to the invention of formula (I) have the advantage to extend the pot life of the crosslinkable compositions and allow the curing of the crosslinkable compositions at low temperature less than equal to 75° C. in addition to better curing rates, i.e. lower siloxane-based extractables from the cured compositions.

The examples which follow serve for further illustration of the invention. In all examples, all figures for parts and percentages are given by weight, unless otherwise indicated.

Examples

Formulation of the Crosslinkable Compositions

TABLE 1

Emulsion Formulation A of the crosslinkable composition

| Component | Control [parts by wt.] | Examples/ Comparative Examples [parts by wt.] |
|---|---|---|
| DEHESIVE® EM 494[1] | 45.6 | 45.3 |
| Inhibitor | 0.0 | 0.3 (varies)* |
| Crosslinker V 15[2] | 5.6 | 5.6 |
| Ratio SiH:SiVi | 2.0:1 | 2.0:1 |
| Catalyst EM 459[3] | 9.8 (= 200 ppm Pt) | 9.8 (= 200 ppm Pt) |
| Water (for dilution) | 39.0 | 39.0 |
| Total parts | 100.0 | 100.0 |
| Solids | 30% by wt. | 30% by wt. |

*See the amounts mentioned in table 3-9
[1] DEHESIVE® EM 494 (available from Wacker Chemie AG) is an emulsion of a branched siloxane copolymer according to U.S. Pat. No. 7,888,446 B2 with on average four Si-bonded vinyl groups.
[2] Crosslinker V 15 (available from Wacker Chemie AG) is an emulsion of a linear dimethylpolysiloxane having Si-bonded H-atoms with a ratio of $D^H:D = 1.0:0.3$ and 50 D-units.
[3] Catalyst EM 459 (available from Wacker Chemie AG) is a platinum-1,3-divinyl-1,1,3,3-tetramethyldisiloxane-complex dissolved in α,ω-Divinylpolydimethylsiloxane, the so-called Karstedt's catalyst according to U.S. Pat. No. 3,775,452 A.

TABLE 2

Solvent-free Formulation B of the crosslinkable composition

| Component | Control [parts by wt.] | Examples/ Comparative Examples [parts by wt.] |
|---|---|---|
| DEHESIVE® SFX 264[1] | 80.3 | 80.0 |
| Inhibitor | 0.0 | 0.3 (varies)* |
| Crosslinker V 90[2] | 6.7 | 6.7 |
| Ratio SiH:SiVi | 2.0:1 | 2.0:1 |
| Catalyst C 05[3] | 13.0 (= 150 ppm Pt) | 13.0 (= 150 ppm Pt) |
| Total parts | 100.0 | 100.0 |

*See the amounts mentioned in table 3-9
[1] DEHESIVE® SFX 264 (available from Wacker Chemie AG) is a branched siloxane copolymer according to U.S. Pat. No. 7,888,446 B2 with on average four Si-bonded vinyl groups.
[2] Crosslinker V 90 (available from Wacker Chemie AG) is a linear dimethylpolysiloxane having Si-bonded H-atoms with a ratio of $D^H:D = 1.0:0.3$ and 50 D-units.
[3] Catalyst C 05 (available from Wacker Chemie AG) is a platinum-1,3-divinyl-1,1,3,3-tetramethyldisiloxane-complex dissolved in α,ω-Divinylpolydimethylsiloxane, the so-called Karstedt's catalyst according to U.S. Pat. No. 3,775,452 A.

Procedure:

Ingredients were added in the order listed and stirred together for one minute by hand or with a mixer. In some cases, with the emulsions, the inhibitor is added to the vinyl silicone oil prior to emulsification, i.e. it is part of DEHESIVE® EM 494.

Completed 100 g batches were placed on a magnetic stir plate at 400 rpm.

A 5-cc. syringe was used to collect a sample immediately after mixing, and after consecutive hours had passed. Hourly testing continues until the sample has cured (turned solid or very chunky).

The 5 cc. samples were all coated on SCK (supercalendered kraft paper) using a #4 Mayer rod, targeting a coat weight of 1.0 g/m².

The coated paper was then hung in a standard lab oven immediately after coating for 30 seconds at 70° C.

Measurement of the Silicone Extractables:

The degree of curing on the silicone coated paper was then assessed by measuring silicone extractables. In this test, the coated paper is trimmed and put in toluene for 24 hours. Then, the concentration of silicone oil in the toluene is measured with AA (atomic absorption). The answer is expressed as the percentage of silicone coating that is extracted by the toluene (dry weight/dry weight).

The optimal goal is that the system delivers extractables of 10% or less and the pot life is about 4 hours or more. Failure can be caused by the system curing a little bit, which slows further cure down, or by adding too much of an overly effective inhibitor that doesn't release its association with the platinum catalyst well enough at low temperatures. For this reason, testing often continued until complete curing was evident, even though extractables were not passing the 10% criteria. "Less than 10% extractables" means "90% curing or better".

I. Comparative Examples: Inhibitors with an Acetylinic Alcohol Group in Emulsion Formulation A

TABLE 3

Different amounts of inhibitors with an acetylenic alcohol group

| | % Extractables | | | | | | | | | |
|---|---|---|---|---|---|---|---|---|---|---|
| Time | ECH[1] 0.07% | ECH[1] 0.11% | ECH[1] 0.25% | ECH[1] 0.11% MB[2] 0.3% | MB[2] 0.2% | MB[2] 0.3% | MB[2] 0.4% | MB[2] 0.5% | DHL[3] 0.25% | DHL[3] 0.50% |
| Immediate | 1.9 | 2.0 | 44.8 | 1.6 | 30.9 | 6.1 | 15.7 | 19.7 | 4.6 | 3.8 |
| 1 hour | Fail* | 11.3 | 81.4 | 32.0 | 66.9 | 29.2 | 35.4 | 37.6 | 17.3 | 13.1 |
| 2 hours | | 14.3 | 81.4 | 39.1 | Fail* | 40.5 | 42.6 | 39.4 | 26.5 | 25.0 |
| 3 hours | | Fail* | 84.9 | 44.8 | | Fail* | Fail* | Fail* | 29.8 | 30.0 |
| 4 hours | | | 84.6 | Fail* | | | | | Fail* | Fail* |

*Fail means that the silicone coating bath has turned solid because the silicone has cured into rubber.
[1] ECH = 1-ethynylcyclohexan-1-ol,
[2] MB = 2-methyl-3-butyn-2-ol,
[3] DHL = Dehydrolinalool of the formula CH≡C—C(OH)CH₃—CH₂—CH₂—CH═C(CH₃)₂, which is commercially available from BASF Acetylinic alcohols are currently the standard class of inhibitors for most silicone coatings, whether emulsion based or solvent free. 1-Ethynylcyclohexan-1-ol (ECH) is, by far, the most common. 2-Methyl-3-butyn-2-ol (MB) is a much smaller molecule that is better in low temperature applications, but that is known not to work for more than a few hours before it evaporates. DHL is dehydrolinalool. All these molecules have a carbon-carbon triple bond in a terminal position that is connected to another carbon. That third carbon has a pendant hydroxyl group. This structure is referred to as an acetylinic alcohol group.

These inhibitors invariably coordinate with platinum atoms too well to allow for good cure at low temperatures. None passed the 10% criteria at an hour, and none were able to prevent complete curing for four hours except for a high dose of ECH (0.25%), but low temperature curing is very poor (high amount of extractables of 84.6%). All of these have levels that neither last four hours nor offer adequate low temperature cure, demonstrating that only using inhibitors with an acetylenic alcohol group is not an option.

II. Inventive Examples: Inhibitors with an Allylic Alcohol Group in Emulsion Formulation A

TABLE 4

Inhibitors with an allylic alcohol group

| Inhibitor (% by wt.) | Molecular weight $M_w$ [g/mol] | % Extractables Immediate | 1 hour | 2 hours | 3 hours |
|---|---|---|---|---|---|
| Linalool (0.30%) | 154.25 | 3.0 | 3.0 | 9.1 | 15.4 |
| 1-dodecen-3-ol (0.30%) | 184.32 | 2.5 | 2.3 | 6.8 | 22.1 |
| 1-decen-3-ol (0.30%) | 156.27 | 2.2 | 3.3 | 21.4 | 30.5 |
| 1-penten-3-ol (0.20%) | 86.13 | 2.3 | 2.7 | 17.3 | 33.6 |
| 1-hexen-3-ol (0.25%) | 100.16 | 2.5 | 11.1 | 27.1 | 33.8 |
| 1-hepten-3-ol (0.25%) | 114.19 | 2.5 | 16.4 | 26.3 | 35.0 |
| 1,4 pentadien-3-ol (0.20%) | 84.12 | 2.4 | 22.6 | 68.0 | Solid, fail |
| 2-methyl-2-propen-1-ol (0.20%) | 72.11 | 2.2 | 13.9 | 28.8 | Solid, fail |
| 3-methyl-5-hexen-3-ol (0.25%) | 114.19 | 2.3 | 13.3 | 14.4 | Solid, fail |
| 1-vinyl-cyclohexanol (0.25%) | 126.20 | 3.1 | 3.2 | 10.2 | 17.4 |
| 1-vinyl-cyclohexanol (0.50%) | 126.20 | 2.8 | 8.1 | 11.5 | 22.8 |
| 3-methyl-1-penten-3-ol (0.20%) | 100.16 | 2.8 | 12.9 | 17.8 | 18.3 |
| 3-methyl-1-penten-3-ol (0.40%) | 100.16 | 2.9 | 7.6 | 21.3 | 33.2 |
| 2-methyl-1-hepten-3-ol (0.25%) | 128.22 | 2.8 | 13.4 | 18.3 | 17.7 |
| 2-methyl-1-hepten-3-ol (0.40%) | 128.22 | 2.7 | 13.4 | 24.3 | 36.2 |
| 2-methyl-3-buten-2-ol (0.20%) | 86.13 | 3.2 | 13.0 | 18.0 | 18.5 |
| 2-methyl-3-buten-2-ol (0.40%) | 86.13 | 3.0 | 13.3 | 18.0 | 24.6 |
| 1-decen-3-ol (0.30%) | 156.27 | 2.2 | 3.3 | 21.4 | 30.5 |
| 1-penten-3-ol (0.20%) | 86.13 | 2.3 | 2.7 | 17.3 | 33.6 |
| 1-hexen-3-ol (0.25%) | 100.16 | 2.5 | 11.1 | 27.1 | 33.8 |

Molecular Weight:

The molecular weight average Mw is determined by the method of gel permeation chromatography (GPC or size exclusion chromatography (SEC)) with polystyrene standard and a refractive index detector (RI detector). Unless specified otherwise, THF is used as the eluent and DIN 55672-1 is employed.

According to table 4, several allylic alcohols are tested. An allylic alcohol's functional group has a double bond in place of the triple bond present in an acetylinic alcohol. The double bond analogs of the three acetylinic alcohols tested in the previous table 3 are all present here in table 4:

linalool instead of dehydrolinalool, 1-vinyl cyclohexanol instead of 1-ethynylcyclohexan-1-ol, and 2-methyl-3-buten-2-ol instead of 2-methyl-3-butyn-2-ol.

These inventive inhibitors with an allylic alcohol groups show longer pot life and better curing at low temperature (lower % extracts) than the non-inventive inhibitors with an acetylinic group according to table 3.

Many other compounds with the allylic alcohol group and a similar range of molecular weight are tested according to table 4. H—CH(OH)—CH=CH$_2$ is allyl alcohol, which was not tested, because it is very dangerous, and no one will ever use it as an inhibitor. The amount of inhibitor was kept at a fairly normal-to-high level of about 0.30% but was lowered for some of the lighter molecular weight compounds, as it is the mols of inhibitor to mols of platinum in the platinum catalyst that is critical. Linalool was chosen as the best of these.

III. Inventive Examples: Linalool as Inhibitor Compared with Non-Inventive Dehydrolinalool in Emulsion Formulation A

TABLE 5

Linalool compared with dehydrolinalool (DHL)

| | % Extractables | | | | | |
|---|---|---|---|---|---|---|
| | Examples | | | | | Comparative example |
| Time | Linalool (0.3%) | Linalool (0.4%) | Linalool (0.5%) | Linalool (0.6%) | Linalool (0.8%) | DHL 0.50% |
| Imm. | 1.7 | 1.6 | 1.7 | 1.6 | 1.7 | 3.8 |
| 1 h | 2.0 | 2.2 | 3.1 | 3.1 | 5.7 | 13.1 |
| 2 h | 5.3 | 6.7 | 9.2 | 10.9 | 15.6 | 25.0 |
| 3 h | 13.7 | 14.7 | 18.3 | 19.4 | 26 | 30.0 |
| 4 h | Fail* | Fail* | Fail* | Fail* | Fail* | Fail* |

*Fail means that the silicone coating bath has turned solid because the silicone has cured into rubber.

According to Table 5, linalool is used in different amounts in an emulsion formulation. It is important to point out that water in the emulsion helps to inhibit the reaction. Linalool alone, having a terminal vinyl group, will react almost instantaneously with silicon hydride and the silicone bath will gel within seconds. As a component of the emulsion, the linalool does quite well. The DHL (=Dehydrolinalool) 0.50% data from the previous acetylinic alcohol table 3 was included, as a comparative example, but linalool outperforms DHL in every concentration tested here. The results in table 5 shows that increasing the concentration of linalool does not help the inhibition at all.

IV. Inventive Examples: Mixtures of Linalool with 1-Ethynyl-Cyclohexan-1-Ol or 2-Methyl-3-Butyn-2-Ol in Emulsion Formulation A

TABLE 6

Mixture of Linalool with 1-ethynyl-cyclohexan-1-ol (ECH)

| Examples/ Comparative Example | % Extractables | | | | | | |
|---|---|---|---|---|---|---|---|
| | Imm. | 1 h | 2 h | 3 h | 4 h | 5 h | 6 h |
| Linalool (0.3%) + ECH (0.050%) | 3.2 | 3.6 | 8.6 | 29.3 | Fail* | — | — |
| Linalool (0.3%) + ECH (0.075%) | 3.3 | 4.0 | 4.7 | 6.0 | 24.7 | Fail* | — |
| Linalool (0.3%) + ECH (0.100%) | 3.2 | 4.2 | 5.4 | 5.5 | 8.3 | 18.3 | Fail* |
| ECH (0.110%) | 2.0 | 11.3 | 14.3 | Fail* | — | — | — |

*Fail means that the silicone coating bath has turned solid because the silicone has cured into rubber.

TABLE 7

Mixture of Linalool with 2-methyl-3-butyn-2-ol (MB)

| Examples/ Comparative Example | % Extracts | | | | | | | |
|---|---|---|---|---|---|---|---|---|
| | Imm. | 1 h | 2 h | 3 h | 4 h | 5 h | 6 h | 7 h |
| Linalool (0.3%) + MB (0.060%) | 3.1 | 4.0 | 4.3 | 4.7 | 21.1 | Fail* | | |
| Linalool (0.3%) + MB (0.080%) | 2.7 | 4.0 | 5.6 | 7.1 | 7.7 | 8.6 | 16.4 | Fail* |
| Linalool (0.3%) + MB (0.100%) | 3.2 | 4.6 | 6.5 | 9.5 | 9.1 | 11.0 | 11.7 | 12.2 |
| MB (0.200%) | 30.9 | 66.9 | Fail* | | | | | |

*Fail means that the silicone coating bath has turned solid because the silicone has cured into rubber.

V. Inventive Examples: Mixture of Linalool with 1-Ethynyl-Cyclohexan-1-Ol or 2-Methyl-3-Butyn-2-Ol in Solvent-Free Formulation B

TABLE 8

Mixture of Linalool with 1-ethynyl-cyclohexan-1-ol (ECH)

| Examples / Comparative examples | Test | Imm. | 1 h | 2 h | 3 h | 4 h |
|---|---|---|---|---|---|---|
| 0.150% ECH no linalool | Viscosity [cPs] | 274 | 364 | Fail* | | |
| | % Extracts | 4.7 | 13.3 | | | |
| 0.150% ECH + 0.6% linalool | Viscosity [cPs] | 258 | 288 | 908 | Fail* | |
| | % Extracts | 4.3 | 11.1 | 15.1 | | |
| 0.150% ECH + 1.5% linalool | Viscosity [cPs] | 240 | 242 | 276 | Fail* | |
| | % Extracts | 3.3 | 8.8 | 8.7 | | |
| 0.200% ECH no linalool | Viscosity [cPs] | 270 | 276 | 274 | 278 | 294 |
| | % Extracts | 5.7 | 23.2 | 31.0 | 31.0 | 33.0 |
| 0.200% ECH + 0.6% linalool | Viscosity [cPs] | 247 | 246 | 248 | 250 | 256 |
| | % Extracts | 4.0 | 9.0 | 13.2 | 15.3 | 23.3 |
| 0.200% ECH + 1.5% linalool | Viscosity [cPs] | 240 | 240 | 242 | 244 | 250 |
| | % Extracts | 4.4 | 6.7 | 14.6 | 14.3 | 17.1 |

*Fail means that the silicone coating bath has turned solid because the silicone has cured into rubber.

TABLE 9

Mixture of Linalool with 2-methyl-3-butyn-2-ol (MB)

| Examples | Test | Imm. | 1 h | 2 h | 3 h | 4 h | 5 h | 6 h | 7 h |
|---|---|---|---|---|---|---|---|---|---|
| 0.10% MB 0.6% linalool | Visco. [cPs] | 330 | 404 | Cured | | | | | |
| | % Extract | 1.9 | 4.5 | Cured | | | | | |
| 0.15% MB + 0.6% linalool | Visco. [cPs] | 328 | 360 | 452 | Cured | | | | |
| | % Extract | 2.8 | 4.9 | 5.9 | Cured | | | | |
| 0.20% MB + 0.6% linalool | Visco. [cPs] | 320 | 316 | 316 | 316 | 324 | 338 | 358 | 450 |
| | % Extract | 2.5 | 5.8 | 7.7 | 9.1 | 14.8 | 14.8 | 14.1 | 14.9 |
| 0.25% MB 0.6% linalool | Visco. [cPs] | 318 | 306 | 308 | 308 | 314 | 320 | 326 | 336 |
| | % Extract | 3.0 | 5.4 | 9.8 | 6.6 | 12.6 | 16.2 | 16.9 | 22.5 |
| 0.30% MB + 0.6% linalool | Visco. [cPs] | 312 | 304 | 304 | 302 | 308 | 310 | 312 | 316 |
| | % Extract | 3.2 | 5.4 | 9.5 | 7.9 | 16.5 | 17.0 | 20.7 | 25.1 |

According to table 6 and 7, low levels of the acetylinic alcohols EHC (1-ethynyl-cyclohexan-1-ol) and MB (2-methyl-3-butyn-2-ol) were increased slowly in conjunction with the chosen level (0.3%) of linalool until a passing result was established. Looking at the performance data of the comparative examples with ECH and MB alone, the advantage of using the inventive inhibitor linalool is very clear in view of longer pot life and better curing (lower extractables).

Viscosity:

The viscosity is determined by measurement using rotational viscometry in accordance with DIN EN ISO 3219. All viscosity figures are for 25° C. and atmospheric pressure of 1013 mbar.

With solvent free formulations, viscosity is a good indicator of the reaction starting to take place, meaning the pot life will soon expire.

Table 8 shows the advantage in longer pot life and lower extractables (better curing) when using the inventive linalool in combination with 1-ethynyl-cyclohexan-1-ol in solvent-free formulations in comparison to using 1-ethynyl-cyclohexan-1-ol (ECH) alone.

According to table 9, low level of the acetylinic alcohol MB (2-methyl-3-butyn-2-ol) were increased slowly in conjunction with the chosen level (0.6%) of linalool until a passing result was established. Table 9 shows the advantage in long pot life and good curing (low extractables) when using the inventive linalool in combination with 2-methyl-3-butyn-2-ol in solvent-free formulations.

What is claimed is:

1. A process for the preparation of a coating on a thermally activatable label paper, comprising:
    applying to a surface of the thermally activatable label paper, a liquid crosslinkable composition, comprising
    (1) at least one organosilicon compound which has radicals containing aliphatic carbon-carbon multiple bonds
    (2) at least one organosilicon compound having Si-bonded hydrogen atoms
    (3) at least one catalyst which promotes the addition of Si-bonded hydrogen onto an aliphatic multiple bond, and
    (4) at least one agent which retards the addition of Si-bonded hydrogen onto aliphatic multiple bonds at room temperature, of the formula:

$$CH_2=C(R^2)-CR^1(OH)-R \qquad (I)$$

wherein
    R is hydrogen or an alkyl, cycloalkyl, aryl, aralkyl or alkenyl radical having up to 12 carbon atoms, optionally substituted with one or more hydroxyl groups,
    with the proviso that R is not hydrogen if $R^1$ and $R^2$ are both hydrogen,
    $R^1$ is hydrogen or a monovalent hydrocarbon radical having 1 to 12 carbon atoms or $R^1$ together with R form a cyclic hydrocarbon radical having not more than 12 carbon atoms and
    $R^2$ is hydrogen or a monovalent hydrocarbon radical having 1 to 12 carbon atoms, and curing the liquid crosslinkable composition at a temperature of from 40° C. to 75° C.

2. The process of claim 1, wherein the composition is cured at a temperature from 60° C. to 75° C.

3. The process of claim 1, wherein the agent (4) of the formula (I) is linalool, a compound of the formula $$CH_2=CH-C(OH)CH_3-CH_2-CH_2-CH=C(CH_3)_2.$$

4. The process of claim 1, wherein the agents (4) of the formula (I), are used in combination with a hydrosilylation inhibitor which is not of the formula (I).

5. The process of claim 4, wherein the hydrosilylation inhibitor(s), are employed in quantities of from 0.02% by weight to 1.0% by weight based on the overall weight of the organosilicon compounds (1) and (2).

6. The process of claim 4, wherein the hydrosilylation inhibitor(s), are employed in quantities of from 0.04% by weight to 0.30% by weight based on the overall weight of the organosilicon compounds (1) and (2).

7. The process of claim 1, further comprising an acetylenic alcohol hydrosilylation inhibitor.

8. The process of claim 7, wherein the acetylinic alcohol is 1-ethynylcyclohexan-1-ol and/or
2-methyl-3-butyn-2-ol.

9. The process of claim 1, wherein the agents (4) of formula (I) are employed in a quantity of from 0.02% by weight to 3.0% by weight, based on the overall weight of the organosilicon compounds (1) and (2).

10. The process of claim 1, wherein the agents (4) of formula (I) are employed in a quantity of from 0.2% by weight to 1.5% by weight, based on the overall weight of the organosilicon compounds (1) and (2).

11. The process of claim 1, wherein the liquid crosslinkable composition is in the form of an aqueous emulsion.

12. The process of claim 1, wherein the coating is a release coating.

13. The process of claim 1, wherein the coating has a thickness of from 0.6 to 1.2 µm.

14. The process of claim 1, wherein the crosslinkable composition consists of
    (1) organosilicon compounds which have radicals containing aliphatic carbon-carbon multiple bonds;
    (2) organosilicon compounds having Si-bonded hydrogen atoms;
    (3) catalysts which promote the addition of Si-bonded hydrogen onto an aliphatic multiple bond; and
    (4) agents which retard the addition of Si-bonded hydrogen onto aliphatic multiple bonds at room temperature, of the formula $$CH_2=C(R^2)-CR^1(OH)-R \qquad (I)$$

wherein
    R is hydrogen or a monovalent hydrocarbon radical having 1 to 12 carbon atoms, optionally substituted with one or more hydroxyl groups,
        with the proviso that R is not hydrogen if $R^1$ and $R^2$ are both hydrogen,
    $R^1$ is hydrogen or a monovalent hydrocarbon radical having 1 to 12 carbon atoms, or $R^1$ together with R form a cyclic hydrocarbon radical having not more than 12 carbon atoms, and
    $R^2$ is hydrogen or a monovalent hydrocarbon radical having 1 to 12 carbon atoms, and optionally water and/or one or more organic solvents.

* * * * *